US011084131B2

(12) United States Patent
Galliers et al.

(10) Patent No.: US 11,084,131 B2
(45) Date of Patent: Aug. 10, 2021

(54) SYSTEMS AND METHODS FOR REDUCING STRESS AND DISTORTION DURING FRICTION WELDING

(71) Applicant: General Electric Company, Schenectady, NY (US)

(72) Inventors: Brian Christopher Galliers, Liberty Township, OH (US); Dean Fredrick Graber, Hamilton, OH (US); William Victor Alcini, Fort Mitchell, KY (US)

(73) Assignee: General Electric Company, Schenectady, NY (US)

(*) Notice: Subject to any disclaimer, the term of this patent is extended or adjusted under 35 U.S.C. 154(b) by 59 days.

(21) Appl. No.: 16/366,135

(22) Filed: Mar. 27, 2019

(65) Prior Publication Data
US 2020/0306898 A1 Oct. 1, 2020

(51) Int. Cl.
*B23K 20/10* (2006.01)
*B23K 37/04* (2006.01)
*B23K 20/12* (2006.01)
*B29C 65/08* (2006.01)
*B29C 65/64* (2006.01)

(52) U.S. Cl.
CPC ............. *B23K 37/04* (2013.01); *B23K 20/10* (2013.01); *B23K 20/12* (2013.01); *B29C 65/08* (2013.01); *B29C 65/645* (2013.01)

(58) Field of Classification Search
CPC .......... B23K 37/04–0538; B23K 20/10; B23K 20/12–1215; B29C 65/08; B29C 65/645

USPC ............. 228/112.1–114.5, 2.1–2.3, 212–213, 228/44.3–49.6; 156/73.5
See application file for complete search history.

(56) References Cited

U.S. PATENT DOCUMENTS 3,460,232 A 8/1969 Pfaffenberger et al.
3,478,411 A * 11/1969 Hautala ................ B23K 20/129
228/113
3,838,807 A * 10/1974 Nomura ................ B23K 20/12
228/2.3

(Continued)

FOREIGN PATENT DOCUMENTS

CA 2779075 A1 * 5/2011 ......... B23K 20/1255
DE 4029930 A1 3/1992

(Continued)

Primary Examiner — Kiley S Stoner
(74) Attorney, Agent, or Firm — Dority & Manning, P.A.

(57) ABSTRACT

A method for reducing stress and distortion in a component during a friction welding process includes securing first and second workpieces of the component within an inertia welding machine such that the first and second workpieces are affixed in opposition to each other. The method also includes securing at least one annular support member at least partially around the first workpiece and/or the second workpiece at a location having a reduced cross-section as compared to remaining portions of the first workpiece and/or the second workpiece. Further, the method includes rotating the first workpiece to a predetermined rotational speed. In addition, the method includes engaging the second workpiece with the rotating first workpiece so as to generate frictional heat therebetween, thereby welding the first and second workpieces together. As such, the annular support member(s) supports the location having the reduced cross-section during welding.

12 Claims, 5 Drawing Sheets

(56) References Cited

U.S. PATENT DOCUMENTS

| | | | | |
|---|---|---|---|---|
| 3,897,896 | A | * | 8/1975 | Louw ............... B23K 20/12 228/2.3 |
| 4,049,182 | A | * | 9/1977 | Louw ............... B23K 20/12 228/2.3 |
| 4,090,898 | A | * | 5/1978 | Tuskos ............ B29C 66/8161 156/73.5 |
| 4,444,350 | A | * | 4/1984 | Crummett ......... B61H 13/34 228/113 |
| 4,445,265 | A | * | 5/1984 | Olson ............. B23K 20/129 228/114.5 |
| 4,733,814 | A | * | 3/1988 | Penman ............ B23K 20/12 228/114.5 |
| 4,988,399 | A | * | 1/1991 | Watson ............ B29C 49/14 156/73.5 |
| 5,211,100 | A | * | 5/1993 | Fuller ............ F15B 15/1438 92/169.1 |
| 5,813,593 | A | * | 9/1998 | Galaske, Jr. ..... B23K 20/1205 228/112.1 |
| 5,875,953 | A | * | 3/1999 | Shioya ............ B23P 19/027 228/112.1 |
| 5,975,404 | A | * | 11/1999 | Ziemek ............ G02B 6/4488 228/17.5 |
| 6,138,896 | A | * | 10/2000 | Ablett ............ B23K 20/12 228/113 |
| 6,380,505 | B1 | * | 4/2002 | Stoops ............ B23K 9/0286 219/125.11 |
| 6,459,062 | B1 | * | 10/2002 | Guerrina .......... B23K 37/0533 219/60 A |
| 6,749,518 | B2 | | 6/2004 | Carrier et al. |
| 7,487,901 | B2 | | 2/2009 | Talwar et al. |
| 7,694,867 | B2 | | 4/2010 | Swallow et al. |
| 8,061,579 | B2 | | 11/2011 | Feng et al. |
| 10,035,217 | B2 | | 7/2018 | Johnson |
| 2003/0015570 | A1 | * | 1/2003 | Hirose ............ C23C 16/34 228/112.1 |
| 2004/0155092 | A1 | * | 8/2004 | Onuma ............. B23K 20/12 228/112.1 |
| 2006/0157536 | A1 | * | 7/2006 | Wolf .............. B25B 5/147 228/101 |
| 2007/0152015 | A1 | * | 7/2007 | Burton ............ B23K 20/126 228/2.1 |
| 2009/0200356 | A1 | * | 8/2009 | Kawaura ........... B23K 20/12 228/2.3 |
| 2012/0181324 | A1 | * | 7/2012 | Yamauchi .......... B23K 20/124 228/114 |
| 2012/0280485 | A1 | * | 11/2012 | Stol .............. C21D 9/50 285/21.1 |
| 2012/0301307 | A1 | * | 11/2012 | Yang .............. B23K 20/129 416/213 R |
| 2015/0104318 | A1 | * | 4/2015 | Koch .............. B23K 1/20 416/213 R |
| 2017/0095884 | A1 | * | 4/2017 | Kimura ............ B21B 27/03 |

FOREIGN PATENT DOCUMENTS

| | | | | |
|---|---|---|---|---|
| JP | 55128389 | A | * | 10/1980 |
| JP | 62134188 | A | * | 6/1987 |
| KR | 100821056 | B1 | * | 4/2008 |
| WO | WO-2018024718 | A1 | * | 2/2018 ............ B23K 37/00 |

* cited by examiner

SYSTEMS AND METHODS FOR REDUCING STRESS AND DISTORTION DURING FRICTION WELDING

FIELD

The present disclosure relates generally to friction welding and more particularly to systems and methods for reducing stress and distortion during friction welding using one or more bridge rings.

BACKGROUND

In inertia welding, a first workpiece is rotated to a specific speed and then a second workpiece is forced into frictional engagement with the first workpiece with frictional heat being generated to weld together the two components without melting in the contact region. Inertia welding is a forging process which requires elevated forging temperatures for the specific material. An upper forging temperature is typically the melting temperature for the material. A lower forging temperature is the minimum temperature at which an inertia weld can be completed.

A typical inertia welding machine includes first and second opposed machine heads to which the first and second workpieces may be affixed in opposition to each other. The first machine head is rotatable and is powered by a suitable motor for rotating the head and first workpiece to a precise rotational speed. The second machine head is non-rotatable and simply supports the second workpiece. The first machine head includes one or more flywheels to provide the rotary inertia for effecting welding of the two workpieces. The second machine head is axially translatable by a powered piston which engages together the first and second workpieces under a substantial compressive weld load. The second workpiece therefore frictionally engages and brakes the rotating first workpiece creating friction heating at the contact area therebetween which raises the temperature thereof to effect an inertia weld without melting.

Large engine components often have varying-sized cross-sections and therefore varying stresses throughout the part. For example, for certain large engine components (such as the rotor) multiple inertia welds are often required for manufacturing the part. However, inertia welds typically have high stresses in workpieces at existing weld locations (i.e. from one weld to the next) that can permanently deform or rupture their shape. For example, the geometry of the workpieces at existing weld locations typically has a reduced cross-sectional area. As such, the load during welding can create a bending moment at the prior weld location (s).

As such, improved systems and methods for manufacturing components via inertia welding that address the aforementioned issues would be welcomed in the art. Accordingly, the present disclosure is directed to improved inertia welding processes that utilize annular support members during welding that temporarily change the geometry of the workpiece so as to balance the load distribution of the part, thereby reducing stress and distortion during welding.

BRIEF DESCRIPTION

Aspects and advantages of the invention will be set forth in part in the following description, or may be obvious from the description, or may be learned through practice of the invention.

In one aspect, the present disclosure is directed to a method for reducing stress and distortion in a component during a friction welding process. The method includes securing first and second workpieces of the component within an inertia welding machine such that the first and second workpieces are affixed in opposition to each other. The method also includes securing at least one annular support member at least partially around the first workpiece and/or the second workpiece at a location having a reduced cross-section as compared to remaining portions of the first workpiece and/or the second workpiece. Further, the method includes rotating the first workpiece to a predetermined rotational speed. In addition, the method includes engaging the second workpiece with the rotating first workpiece so as to generate frictional heat therebetween, thereby welding the first and second workpieces together. As such, the annular support member(s) supports the location having the reduced cross-section during welding.

In another aspect, the present disclosure is directed to a method for reducing stress and distortion in a component during a friction welding process. The method includes joining first and second workpieces of the component together at a first weld via friction welding. The method also includes securing a first annular support member at least partially around the first weld so as to temporarily increase a cross-sectional dimension and/or area of the first weld. Further, the method includes joining a third workpiece to the joined first and second workpieces of the component at a second weld via friction welding. As such, the first annular support member supports the first weld during welding of the third workpiece.

In yet another aspect, the present disclosure is directed to an annular support member assembly for reducing stress and distortion in a component during a friction welding process. The annular support member assembly includes at least one annular support member sized for securing around a first workpiece and/or a second workpiece at a location having a reduced cross-section. The annular support member(s) has a ring-shaped body portion and a plurality of protrusions arranged circumferentially on an exterior surface of the body portion. As such, the protrusions are configured to support the location having the reduced cross-section during a welding procedure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error.

Figure 1:
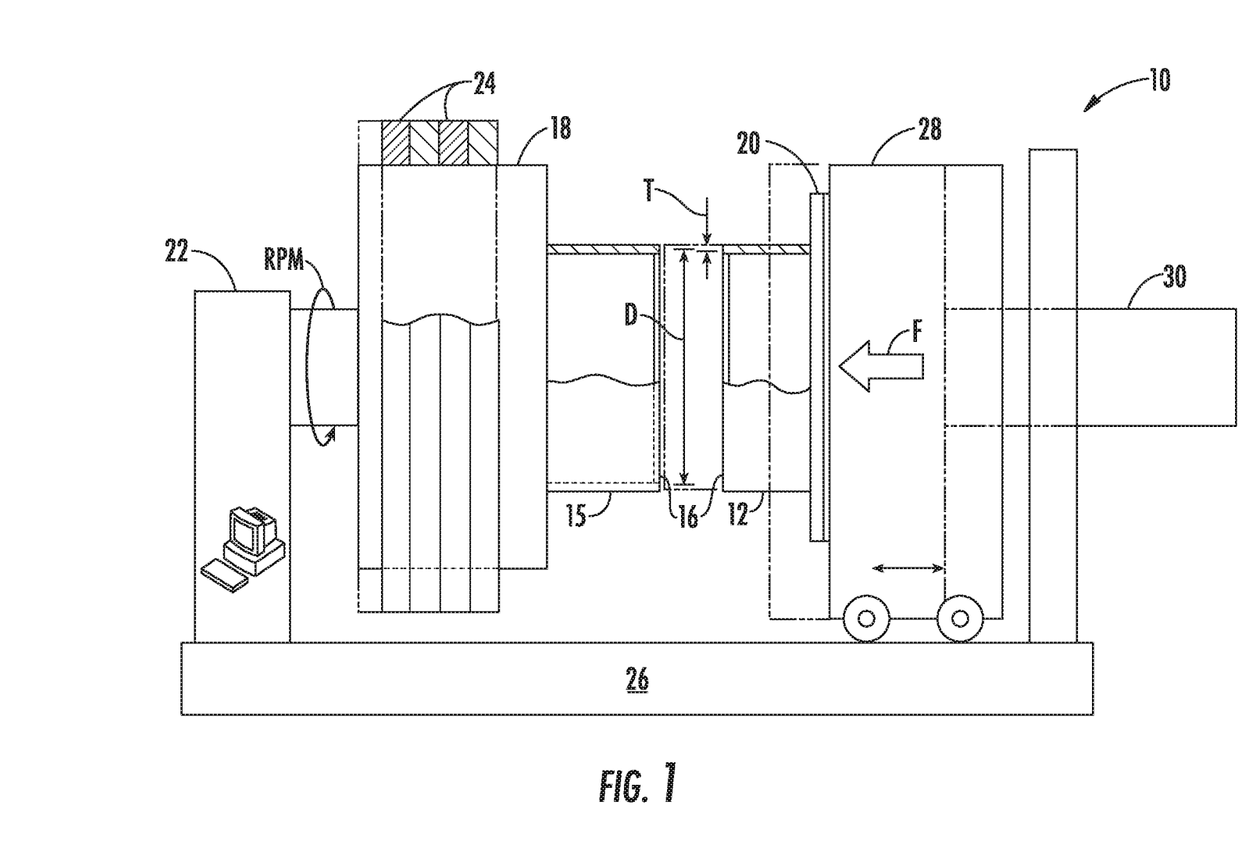
FIG. 1 illustrates a perspective view of one embodiment of an inertia welding machine according to the present disclosure.

Referring now to the drawings, FIG. 1 illustrates an inertia welding machine 10 for inertia welding together multiple workpieces or parts 15, 12 which may have any suitable configuration. In the illustrated embodiment, the workpieces 15, 12 are annular members which are inertia welded together for use as combustor, turbine, or compressor structural casings or pressure vessels in an aircraft gas turbine engine. Thus, as shown, the workpieces 15, 12 are coaxially aligned with each other and have opposing weld workpiece shapes (preps) or contact areas 16 at which inertia welding is applied. The weld preps 16 have an average diameter D and a weld prep thickness T.

In addition, as shown, the machine 10 includes a first machine head 18 that is suitably affixed to the first workpiece 15, and a second machine head 20 to which the second workpiece 12 is suitably affixed. Further, as shown, the first machine head 18 may be operatively joined to a suitable motor 22, such as a hydraulic motor, for being rotated during operation at a suitable rotary speed expressed in revolutions per minute (RPM). Suitably attached to the first machine head 18 are one or more annular flywheels 24 that are selectively used for controlling the rotational mass moment of inertia of the first machine head 18 for effecting inertia welding energy.

Accordingly, the motor 22 and first machine head 18 may be suitably attached to a supporting frame 26 at one end thereof, whereas the second machine head 20 may be carried by a suitable truck or carriage 28 on the opposite end of the frame 26. As such, the second machine head 20 is not rotatable on the truck 28, and the truck 28 is operatively joined to a hydraulic piston 30 which is configured for translating the truck 28 horizontally atop the frame 26 for engaging the first and second workpieces 15, 12 at the weld preps 16 under a specific weld load or force F, expressed in pounds force for example.

Figure 2:
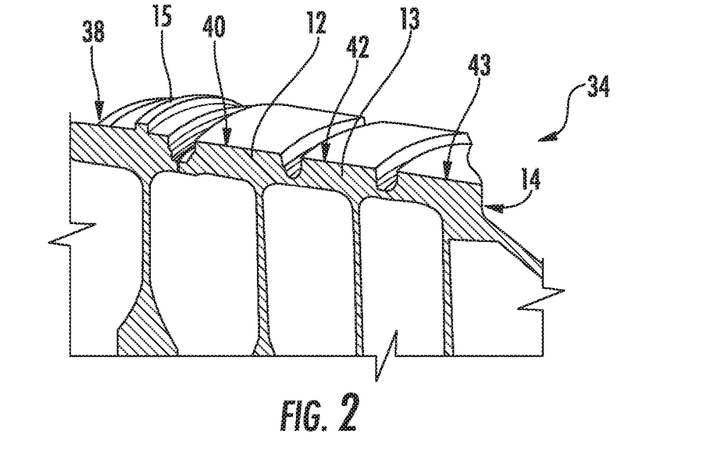
FIG. 2 illustrates a perspective view of one embodiment of a rotor formed via an inertia welding machine according to the present disclosure.

The first and second workpieces 15, 12 of FIG. 1 are illustrated as simple cylindrical workpieces. However, in reality, the first and second workpieces 15, 12 are not necessarily thick, cylindrical parts. Rather, as shown in FIG. 2, the component is formed of a plurality of workpieces 15, 12, 13, 14 having varying cross-sections. More specifically, FIG. 2 illustrates a simplified, perspective view of one embodiment of a portion of a component made using inertia welding accordingly the present disclosure is illustrated. In one embodiment, the component may be formed of a high strength, heat resistant superalloy material for use in various hot section components of an aircraft gas turbine engine. For example, as shown in FIG. 2, the component may correspond to a rotor 34 for a gas turbine engine. A typical turbine superalloy may be nickel-based and may have a forging temperature of about 200° F. below the melting temperature thereof. For example, the superalloy material of the workpieces 15, 12 may be nickel-based and include those commercially available under the trademarks Inconel, Waspaloy, Hastelloy, and Rene which have various alloy designations such as Inconel 718, Rene 95, and Rene 88, all of which have corresponding AMS specifications which are conventionally known. Still other components of the gas turbine engine may also be manufactured according to the methods described herein, such as the stator. In another embodiment, the manufacturing methods described herein may be applied to components outside of gas turbine engines as well.

Figure 3:
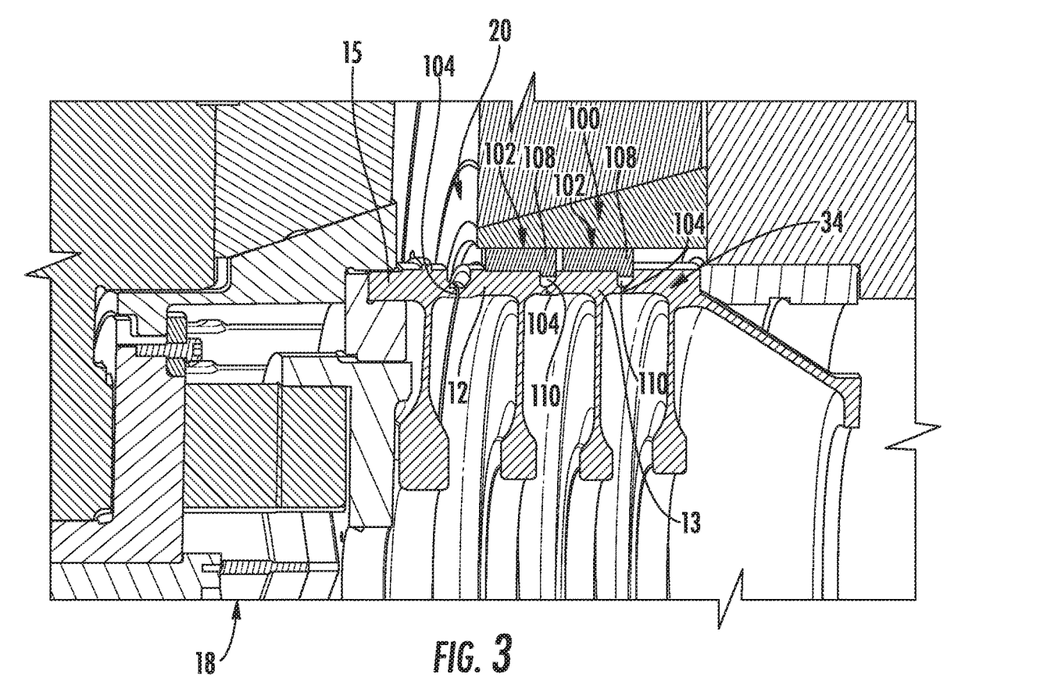
FIG. 3 illustrates a cross-sectional view of one embodiment of a rotor being formed via an inertia welding machine according to the present disclosure, particularly illustrating a plurality of support members arranged around the rotor for supporting existing welds during subsequent welding processes.

As shown in FIG. 2, the rotor 34 may have four rotor stages or disks 38, 40, 42, 43. It should be understood that the number of rotor stages may vary according to the type of gas turbine engine. As such, the various rotor stages are welded together using the inertia welding techniques described herein. Accordingly, as shown in FIG. 3, a cross-sectional view of one embodiment of the inertia welding machine 10 according to the present disclosure is illustrated. More specifically, as shown, the rotor 34 may be formed of multiple workpieces 15, 13, 12, 14 that are welded together using the inertia welding machine 10. Further, as shown, a ring-shaped or annular support member assembly 100 is provided around one or more of the workpieces 15, 13, 12, 14 for reducing stress and distortion in the rotor 34 during the friction welding process. For example, as shown, the annular support member assembly 100 includes at least one annular support member 102 for securing around the various workpieces 15, 13, 12, 14, e.g. at a location having a reduced cross-section as compared to remaining portions of the first and/or second workpieces 15, 13, 12, 14. More specifically, as shown, the locations of reduced cross-sections may correspond to areas containing a weld 104. Inertia welds typically have high stresses in workpieces at prior weld locations that might permanently deform or rupture their shape. As such, the annular support members 102 described herein can be placed at the weld locations to provide support during further welding processes.

It should be understood that the annular support member(s) 102 described herein may extend partially around the workpieces 15, 13, 12, 14 and/or completely around the workpieces 15, 13, 12, 14. In addition, any suitable number of annular support members 102 may be utilized during the welding process. By way of example, the annular support member assembly 100 of FIG. 3 includes two annular support members 102 such that each of the existing welds 104 (or any areas needing additional support) of the rotor 34 is fully supported during welding of subsequent workpieces. As such, in additional embodiments, more than two or less than two annular support members 102 may be used during the welding process.

Figure 4:
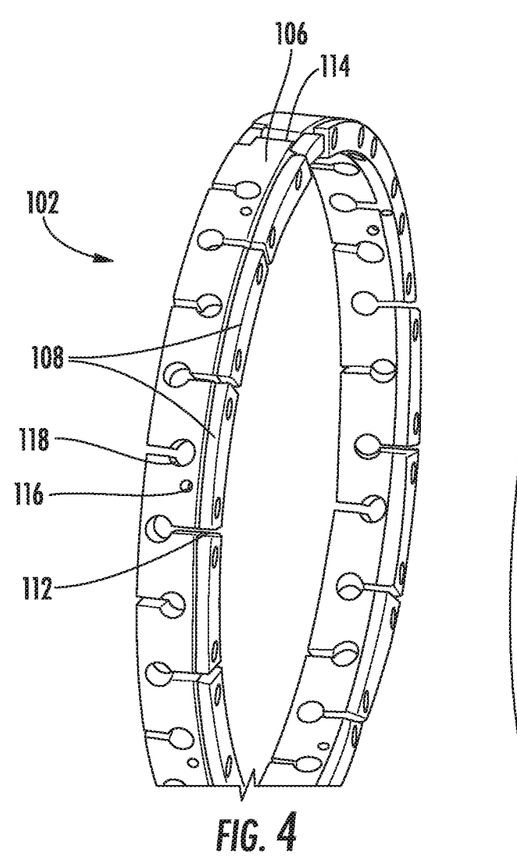
FIG. 4 illustrates a perspective view of one embodiment of an annular support member for supporting an existing weld during an inertia welding process according to the present disclosure.
Figure 5:
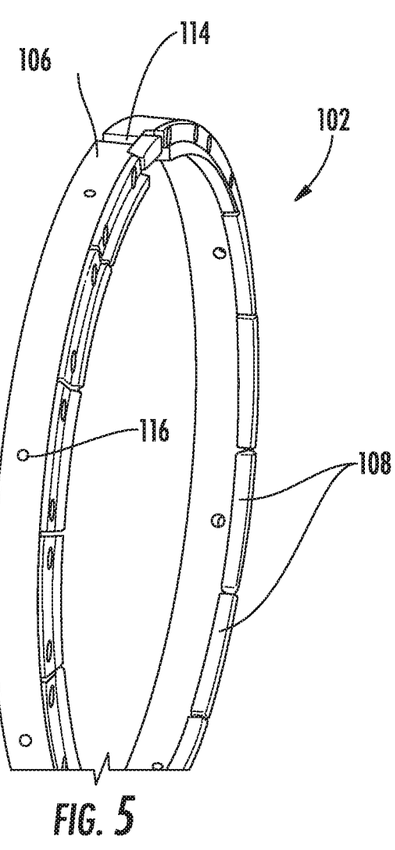
FIG. 5 illustrates a perspective view of another embodiment of an annular support member for supporting an existing weld during an inertia welding process according to the present disclosure.

Referring now to FIGS. 4 and 5, perspective views of different embodiments of the annular support member 102 according to the present disclosure are illustrated. Thus, it should be understood that the annular support members 102 described herein may have the same shape or a different shape based on the location where the annular support member 102 is intended to fit on the workpiece. In general, each of the annular support members 102 of the present disclosure may include a ring-shaped body portion 106 and a plurality of protrusions 108 extending from the body portion 106. In such embodiments, the protrusions 108 are configured to support the locations of the welds 104, i.e., by extending at least partially within the grooves 110 of the rotor 34 (FIG. 3) that contain the welds 104. In addition, as shown, each of the protrusions 108 of the annular support member(s) 102 may be arranged circumferentially around the body portion 106 and spaced apart from an adjacent protrusion via a gap 112. In further embodiments, the protrusions 108 may be integral with the body portion 106 or may be separately attached to the body portion 106.

In addition, as shown, the annular support member(s) 102 described herein may be secured around the workpieces 15, 13, 12, 14 via one or more hinges 114. More specifically, the annular support member(s) 102 may be split at one or more locations such that opening of the hinge 114 opens the annular support member 102 such that it can be slid around the one of the workpieces. The annular support member(s) 102 may also include one or more jacking features 116 that can be utilized in the event that the annular support member 102 gets stuck. In such situations, the jacking features 116 are configured to force the protrusions 108 out of the grooves of the rotor 34. In still further embodiments, the annular support members 102 may have the same features or different features based on its desired location. For example, as shown in FIG. 4, the illustrated annular support member 102 includes a plurality of cutouts 118 for providing increased flexibility to the support member 102. For example, in certain embodiments, the cutouts 118 allow the annular support member 102 to decrease its diameter during clamping to the rotor 34.

Figure 6:
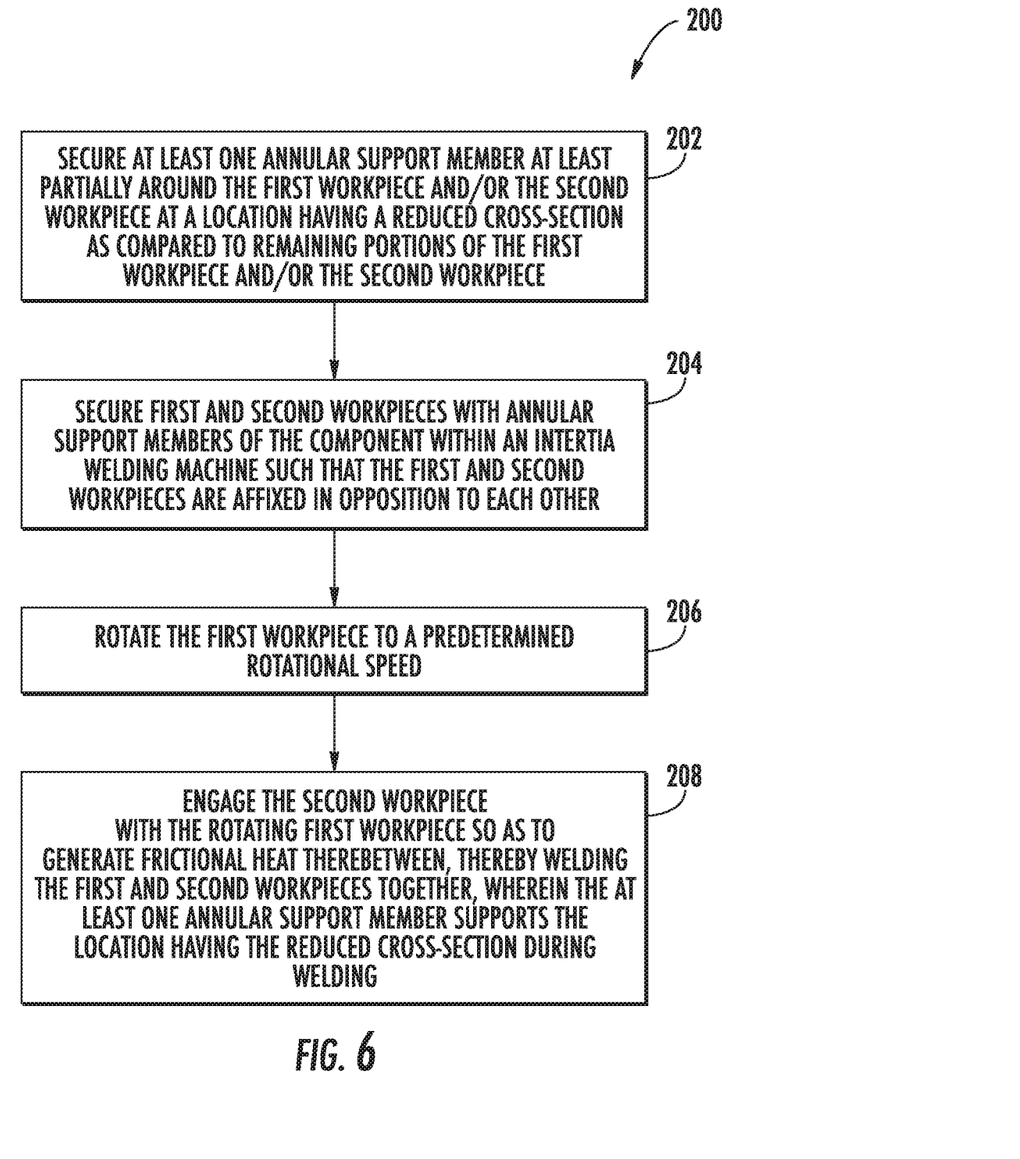
FIG. 6 illustrates a flow chart of one embodiment of a method for reducing stress and distortion in a component during a friction welding process according to the present disclosure.

Referring now to FIG. 6, a flow chart of one embodiment of a method 200 for reducing stress and distortion in a component during an inertia/friction welding process is illustrated. In general, the method 200 will be described herein with reference to the inertia welding machine 10 of FIGS. 1 and 3. However, it should be appreciated that the disclosed method 200 may be implemented with inertia welding machines having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes securing at least one annular support member 102 at least partially around the first workpiece 15 and/or the second workpiece 15 at a location having a reduced cross-section as compared to remaining portions of the first workpiece and/or the second workpiece. As shown at (204), the method 200 includes securing the first and second workpieces 15, 12 of the rotor 34 within the inertia welding machine 10 such that the first and second workpieces 15, 12 are affixed in opposition to each other. As shown at (206), the method 200 further includes rotating the first workpiece 15 to a predetermined rotational speed. As shown at (208), the method 200 includes engaging the second workpiece 12 with the rotating first workpiece 15 so as to generate frictional heat therebetween, thereby welding the first and second workpieces together 15, 12. Thus, as mentioned, the annular support member(s) 102 supports the location having the reduced cross-section during welding.

More specifically, in certain embodiments, the first machine head 18 and attached first workpiece 15 are accelerated to a predetermined rotary speed, and then the piston 30 is actuated to drive the truck 28 and attached second workpiece 12 in frictional engagement with the first workpiece 15 at the weld prep 16 under a predetermined weld load F. Upon application of the weld load, the motor 22 is disconnected from the first machine head 18, which in the case of a hydraulic motor is accomplished by simply interrupting the hydraulic pressure, and the inertia of the flywheels 24 imparts energy at the engaging weld preps 16 which undergo frictional heating as the second workpiece 12 frictionally brakes the rotating first workpiece 15. The friction generated at the weld preps 16 locally increases the temperature of the two workpieces 15, 12 to a temperature below the melting temperature of the workpieces, yet sufficiently high for effecting a forged, friction weld therebetween. Further, the annular support member(s) 102 support existing weld locations during the inertia welding process.

Figure 7:
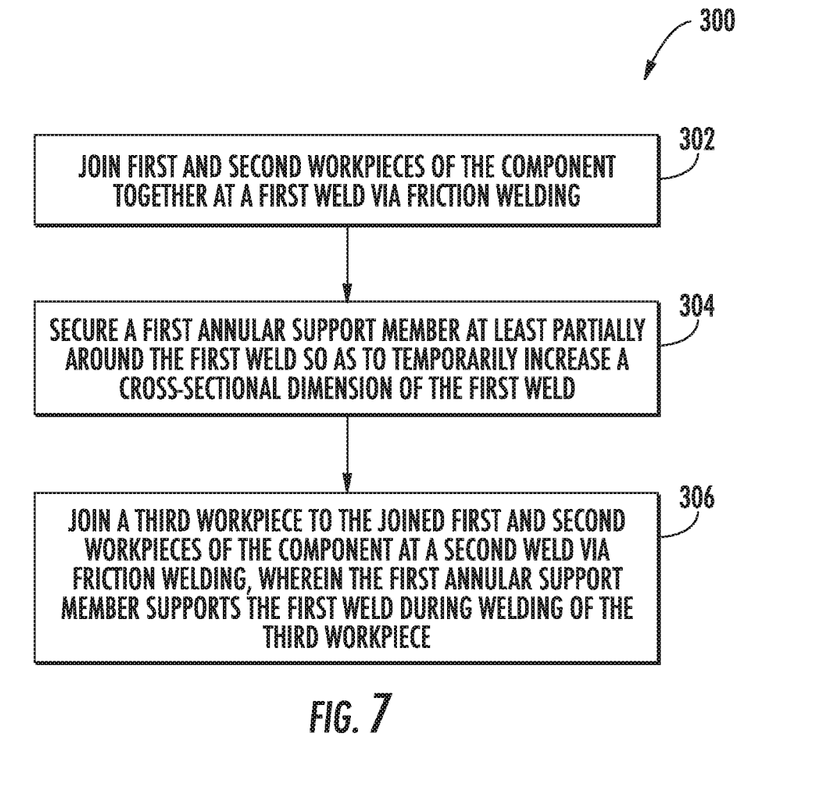
FIG. 7 illustrates a flow chart of another embodiment of a method for reducing stress and distortion in a component during a friction welding process according to the present disclosure.

Referring now to FIG. 7, a flow chart of one embodiment of a method 300 for reducing stress and distortion in a component during an inertia/friction welding process is illustrated. In general, the method 300 will be described herein with reference to the inertia welding machine 10 of FIGS. 1 and 3. However, it should be appreciated that the disclosed method 300 may be implemented with inertia welding machines having any other suitable configurations. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 includes joining the first and second workpieces of the component together at a first weld via friction welding. As shown at (304), the method 300 includes securing a first annular support member at least partially around the first weld so as to temporarily increase a cross-sectional dimension and/or area of the first weld. As shown at (306), the method 300 includes joining a third workpiece to the joined first and second workpieces of the component at a second weld via friction welding. As such, the first annular support member supports the first weld during welding of the third workpiece.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing stress and distortion in a component during a friction welding process, the method comprising:
   securing first and second workpieces of the component within an inertia welding machine such that the first and second workpieces are affixed in opposition to each other;
   securing at least one annular support member at least partially around the first workpiece and/or the second workpiece at a location having a reduced cross-section as compared to remaining portions of the first workpiece and/or the second workpiece;
   rotating the first workpiece to a predetermined rotational speed; and
   engaging the second workpiece with the rotating first workpiece so as to generate frictional heat therebetween, thereby welding the first and second workpieces together,
   wherein the at least one annular support member supports the location having the reduced cross-section during welding, wherein the location having the reduced cross-section comprises a weld.

2. The method of claim 1, wherein the at least one annular support member is secured completely around the first workpiece and/or the second workpiece.

3. The method of claim 2, wherein the at least one annular support member comprises a ring-shaped body portion and a plurality of protrusions extending from the body portion, the plurality of protrusions configured to support the location having the reduced cross-section.

4. The method of claim 3, wherein each of the plurality of protrusions of the at least one annular support member are spaced apart from an adjacent protrusion via a gap, the plurality of protrusions arranged circumferentially around the body portion.

5. The method of claim 3, wherein securing the at least one annular support member at least partially around the first workpiece and/or the second workpiece further comprises securing a plurality of annular support members at least partially around the first workpiece and/or the second workpiece at a plurality of locations having a reduced cross-section as compared to remaining portions of the first workpiece and/or the second workpiece.

6. The method of claim 3, wherein the at least one annular support member further comprises one or more jacking features for assisting removal of the at least one annular support member.

7. The method of claim 1, wherein the at least one annular support member is secured at least partially around the first workpiece and/or the second workpiece via one or more hinges.

8. The method of claim 1, wherein the component comprises at least one of a rotor or a stator of a gas turbine engine.

9. A method for reducing stress and distortion in a component during a friction welding process, the method comprising:
   joining first and second workpieces of the component together at a first weld via friction welding;
   securing a first annular support member at least partially around the first weld so as to temporarily increase a cross-sectional dimension and/or area of the first weld; and
   joining a third workpiece to the joined first and second workpieces of the component at a second weld via friction welding,
   wherein the first annular support member supports the first weld during welding of the third workpiece, and
   wherein the first weld joins the first workpiece and the second workpiece to one another at a location having a reduced cross-sectional dimension and/or area relative to remaining portions of the first workpiece and/or the second workpiece.

10. The method of claim 9, further comprising:
    securing one or more additional annular support members at least partially around one or more additional welds so as to temporarily increase a cross-sectional dimension and/or area of the one or more additional welds; and
    joining one or more additional workpieces to the joined first, second, and third workpieces of the component at the one or more additional welds via friction welding, wherein the first annular support member and the one or more additional annular support members provide support to the first weld and the one or more additional welds during welding of the one or more additional workpieces.

11. The method of claim 9, wherein the first annular support member comprises a ring-shaped body portion and a plurality of protrusions extending from the body portion, the plurality of protrusions configured to support the location having the first weld.

12. The method of claim 11, wherein each of the plurality of protrusions of the first annular support member are spaced apart from an adjacent protrusion via a gap, the plurality of protrusions arranged circumferentially around the body portion.

* * * * *